Figure 1:
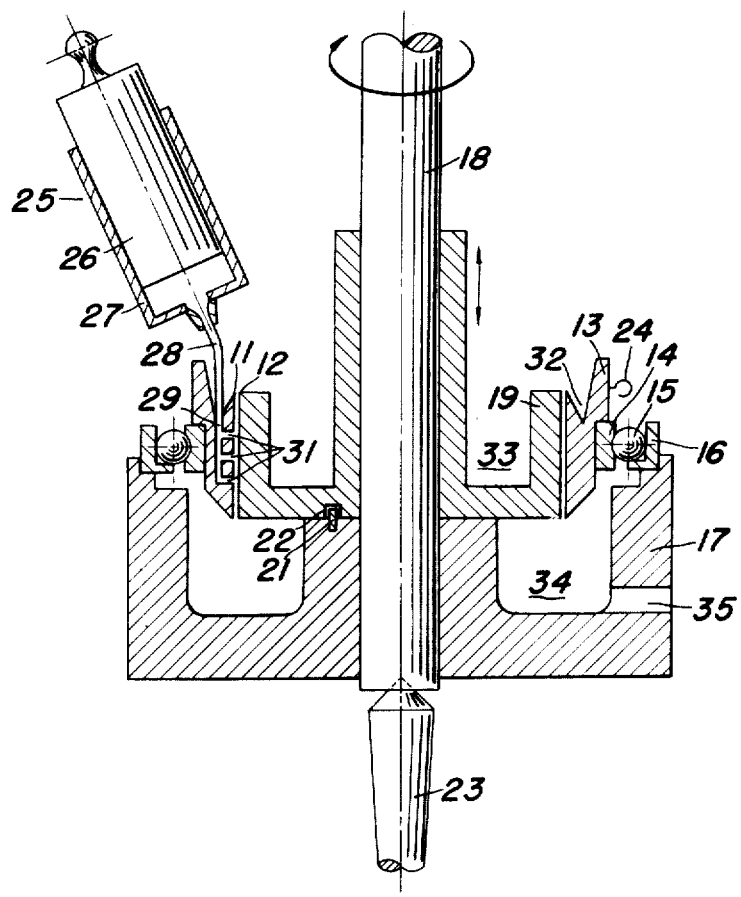

Nov. 12, 1957     E. W. MERRILL     2,812,656
VISCOMETER

Filed Jan. 25, 1954     2 Sheets-Sheet 1

Inventor
Edward Wilson Merrill
By Theodore C. Browne
Attorney

Inventor
Edward Wilson Merrill
By Theodore C. Browne
Attorney

United States Patent Office 2,812,656
Patented Nov. 12, 1957

2,812,656
VISCOMETER

Edward Wilson Merrill, Cambridge, Mass.

Application January 25, 1954, Serial No. 406,029

7 Claims. (Cl. 73—60)

This invention relates to a coaxial cylinder viscometer capable of measuring absolute point values of both shearing stress and velocity gradient. This instrument will give direct readings of shearing stress through a range of velocity gradients much greater than heretofore obtainable.

In a Newtonian liquid undergoing laminar flow at constant temperature and pressure, the velocity gradient established in the direction normal to flow by a shearing stress in the direction of flow bears a constant ratio to the shearing stress. This ratio is defined as the coefficient of viscosity (or simply, viscosity) and may be expressed as $$\eta = \frac{\tau}{D}$$

in which $D$ is the point value of velocity gradient, $\tau$ is the corresponding point value of shearing stress, and $\eta$ is the (coefficient of) viscosity.

Any fluid for which the ratio of $$\frac{\tau}{D}$$

is not constant at various values of $\tau$ or $D$ while that fluid is undergoing laminar flow at constant temperature and pressure is referred to as non-Newtonian. It is convenient and frequently quite necessary to express the rheological properties of such a fluid as a plot of $\tau$ versus $D$. Since such a plot is not a straight line passing through the origin, as in the case of a Newtonian fluid, two further definitions of viscosity are customarily used in respect to non-Newtonian fluids. Apparent viscosity ($\eta_a$) is the gross ratio of $\tau$ to $D$ for a specified value of $\tau$ or $D$. Differential viscosity ($\eta_d$) is the instantaneous value of $$\frac{d\tau}{dD}$$

(e. g., the slope of the plot referred to above) at a specified value of $\tau$ or $D$.

A further variation from the Newtonian concept of fluid flow occurs in the case of thixotropic fluids where the ratio of $\tau$ to $D$ may vary not only with changes in $\tau$ or $D$ but also as a function of the previous shearing history of the fluid. Thixotropy is frequency shown as a plot of $\tau$ versus time at a constant $D$, and is also illustrated as a loop figure, if $\tau$ versus $D$ is plotted first for velocity gradients increasing from zero to a maximum value followed by decrease of gradients to zero.

Capillary and falling-ball viscometers, which have acknowledged advantages in the viscometry of Newtonian fluids, are rarely used in the study of non-Newtonian fluids. The fact that such viscometers subject the fluid under test to a flow pattern in which $\tau$ and $D$ vary continuously from one point in the fluid to another makes the interpretation of the flow of a non-Newtonian fluid in terms of point values of $\tau$ or $D$ entail extensive calculation.

It has been customary, therefore, to use a rotational viscometer for investigating the viscometry of viscous or non-Newtonian fluids. Rotational viscometers, such as that of Couette or the many modifications of its design, such as those of Hatschek, Macmichael, or Stormer, consist of a cylindrical cup and a cylindrical bob. The bob is suspended in the cup with the material to be tested in the intervening space. Measurements are made by rotating either the bob or the cup, and the coefficient of viscosity and the yield value of the fluid are calculated from the corresponding values of the rotation and of the torque imposed by the viscous drag of the fluid which results.

Such viscometers, however, have certain shortcomings which are especially noticeable in the investigation of the flow properties of fluids which develop strong gel structures, such as aged solutions of high polymers. When used with such fluids, these viscometers become practically inoperable for reasons which may be summarized as follows. There is an inherent error in the determination of $D$ due to the width of the cylindrical annulus containing the fluids. The maximum value of $D$ is limited to not over 600 reciprocal seconds and usually not over 100 reciprocal seconds, since the relatively wide annulus permits the onset of turbulent flow in the fluid at these relatively low rotational velocities. It is difficult to maintain the bob in a centered position relative to the cup as, for example, by a bottom pivot, without introducing erratic variations in the torque produced. It is difficult to maintain controlled temperatures due to the relatively large volumes of liquid required and the difficulty of effectively providing the central bob with a heating or cooling fluid. Finally, end effects owing to the non-uniformity of the velocity gradient in the region between the bottom of the bob and the bottom of the cup introduce a variable error into the readings.

Certain special instruments capable of providing high velocity gradients have been designed to test specific fluids, such as lubricating oil, paint, and printing ink. However, none of these would appear to be suitable for general viscometry because of various structural deficiencies, for example, the lack of means for insuring that the shearing surfaces will be properly centered and positioned in the event that the fluid is not perfectly uniform in consistency.

In order to overcome the deficiencies of the viscometers of the prior art, I have developed a new type of coaxial cylinder viscometer that permits the absolute measurement of $\tau$ and $D$ as point values throughout an exceedingly wide range of value of either. In this viscometer the shearing plane is defined by bottomless, annular, cylindrical surfaces having a rigid and precise coaxial alignment and a very small clearance. The fluid to be tested is introduced by means of a closed, pressure feeding system.

A viscometer made according to the present invention has the following advantages:

(1) The ability to test a wide variety of viscous and non-Newtonian fluids, including gels and pigmented fluids.

(2) The minimization of the end effects associated with the conventional rotational viscometers.

(3) The establishment of a substantial point value of velocity gradient throughout the entire body of the fluid under test because of the small annular clearance.

(4) A variability of velocity gradient over a wide range and up to high values.

(5) A good control of temperature of the fluid under test.

(6) The ease of introduction of fluids such as gels or highly viscous fluids.

(7) The minimization of solvent loss from solvent solutions prior to and during test.

Figure 2:
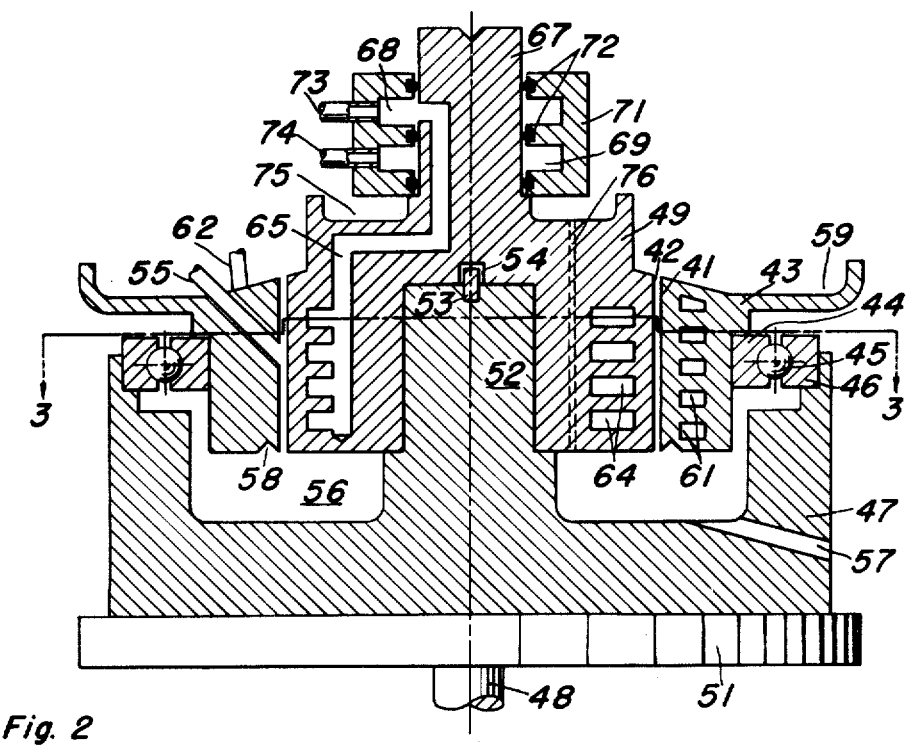
Figure 3:
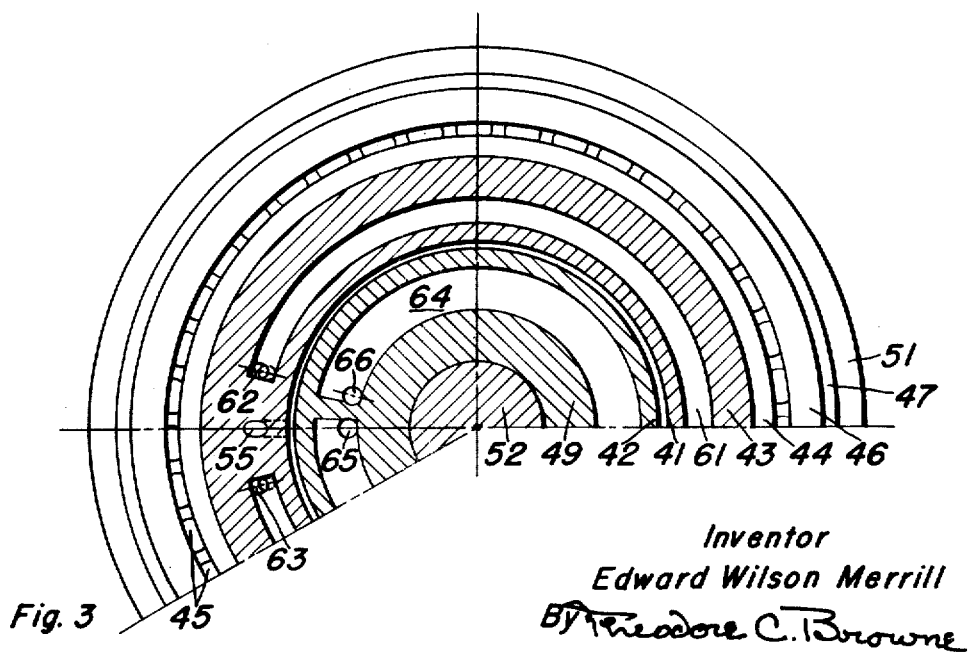

Referring now to the drawing:

Figure 1 is a vertical cross section of a typical viscometer made according to the present invention, Figure 2 is a vertical cross section of a refinement of the viscometer of Figure 1, and Figure 3 is a horizontal cross section of the viscometer of Figure 2.

During operation, the fluid to be tested is contained between two concentric cylindrical surfaces, outer cylindrical surface 11 and inner cylindrical surface 12, as shown in Figure 1. The two surfaces are of equal height and are aligned so as to face each other throughout their entire extent. Outer cylinder 13, i. e., the supporting member for outer cylindrical surface 11, is mounted on the inner race 14 of ball bearing 15. The outer race 16 of ball bearing 15 is mounted in frame 17. Frame 17 is securely affixed to vertical shaft 18. Inner cylinder 19, i. e., the supporting member for inner cylindrical surface 12, is in snug but sliding engagement with shaft 18. Inner cylinder 19 is keyed to frame 17 by means such as pin 21, which is mounted vertically in frame 17 and which engages in a hole 22 in the bottom surface of inner cylinder 19. All of the members so far enumerated are circular in cross section and are mounted concentrically about shaft 18 with their respective circular planes perpendicular to the axis of said shaft. The upper end of shaft 18 is mounted in a suitable rotational drive means such as the chuck of a drill press (not shown), and the lower end rests in a suitable rotational support means, such as lathe center pin 23 mounted so as to maintain the axis of shaft 18 in a vertical position.

Frame 17, since it is affixed to shaft 18, rotates with that shaft when the latter is rotated; so also does inner cylinder 19, since it is keyed to frame 17. Outer cylinder 13 is attached to a force-measuring device (not shown) in such a manner that substantial angular deflection of the outer cylinder is prevented. A typical means of attaching the outer cylinder to such a device is a cord fastened to hook 24 on the outer surface of outer cylinder 13. This cord is then passed over a substantially frictionless pulley so positioned that the cord is horizontal to and tangential to the outer surface of outer cylinder 13 and is then passed vertically to a suitable conventional laboratory balance, such as triple beam balance, secured on a frame overhead.

The fluid is injected into the gap or annulus between outer cylindrical surface 11 and inner cylindrical surface 12 from a syringe 25, consisting of piston 26 in cup 27, through nozzle 28 and into hole 29 drilled in outer cylinder 13. The lower end of nozzle 28 and the upper edge of hole 29 are so formed as to provide a tight but releasable connection. A series of small horizontal holes 31, which pass from hole 29 through outer cylindrical surface 11, provide a passage for the fluid into the annulus.

The upper surface of outer cylinder 13, outboard of cylindrical surface 11, is grooved in the form of a gutter 32 to collect any surplus fluid which may emerge from the upper end of the gap between the two cylindrical surfaces. The inner edge of the gutter is positioned as closely as possible to the upper edge of outer cylindrical surface 11 to provide a knife edge to prevent the excessive build up of material at that point. The outer edge of gutter 32 is built up to a level higher than the inner edge to prevent fluid from flowing over onto bearing 15 should, perchance, the annulus be overfilled. A similar knife edge is provided on the lower surface of cylinder 13.

Inner cylinder 19 is provided with a cylindrical open top chamber 33, which may be used to receive continuously a stream of water from a thermostatic bath in order to keep the fluid under test at constant temperature. A reservoir 34 is provided in frame 17 beneath the lower edge of the gap between inner cylindrical surface 12 and outer cylindrical surface 11. This reservoir should be of ample size to collect any fluid which may exude from the gap during the course of the run without permitting the liquid level in said reservoir to rise sufficiently to contact either cylinder. Ports, as indicated at 35, are provided through the wall of frame 17 to permit drainage of fluid from reservoir 34.

A typical viscometer made according to this disclosure has the following dimensions:

Diameter of inner cylindrical surface 12—2.490"
Diameter of outer cylindrical surface 11—2.502"
Height of surfaces 11 and 12—1.0"
Clearance between surfaces 11 and 12—0.0060±0.0003"

In addition, the inner cylindrical surface is parallel to the axis of the instrument to within ±0.0001", and its deviation from a true circle at any plane is less than ±0.0001". The outer cylindrical surface is parallel to the axis of the instrument to within ±0.0002", and its deviation from a true circle at any plane is ±0.0002". It will be appreciated from later discussion that these particular dimensions are not critical but may be varied considerably according to the nature of the fluid intended to be tested and the accuracy to which measurements are desired.

A viscometer constructed as described has been used to investigate velocity gradients in the range 0 to 6,700 reciprocal seconds (sec.$^{-1}$) and viscosities in the range 50 to 9,000 centipoises. The upper limit in either case does not represent the practical limit of the instrument but rather represents limits imposed by the particular drive mechanism and by the force-measuring instruments employed. The lower limit of measurable viscosity is imposed by the rate of drain-out of the fluid being tested from the annulus between the cylinders. With an annulus of the dimensions given above, the rate of drain-out for Newtonian fluids having a viscosity of 50 centipoises is negligible but would become appreciable for fluids with lower viscosities. Obviously this limit may be lowered by reducing the gap between the cylinders.

The viscometer is operated in the following manner. Prior to making any experimental observations, bearing 15 is lubricated with spindle oil, and the viscometer is rotated at high speed for a short period to distribute the lubricant. When a high quality bearing is used, it has been found that the speed-drag characteristics of the bearing, if properly lubricated, are constant and reproducible at constant temperature for any given rate of rotation. The magnitude of the bearing drag is measured as force on the force-measuring instrument for each of the rates of rotation intended to be used.

The fluid to be tested is then introduced into syringe 25, and nozzle 28 of the syringe is mounted in hole 29 drilled in outer cylinder 13. The fluid may then be expelled from the syringe into the gap between the cylinders through holes 31. This may be done either while the viscometer is at rest or is rotating at a predetermined rate of rotation, depending upon the requirements of the particular test to be run. Injection of the fluid is continued until the fluid appears at the top of the annulus. Groove 32 in outer cylinder 13 is intended to receive any excess fluid. The syringe may be retained in position in hole 29 on outer cylinder 13 during the course of the test, since the outer cylinder is maintained in a stationary position. In case of fluid loss during the course of a protracted series of tests the gap may thus easily be refilled with the fluid.

The instrument is then rotated at the desired rates of rotation, and the total force imposed upon the outer cylinder is measured. If, as suggested above, the force is measured using a laboratory beam balance, the outer cylinder is maintained in an essentially stationary position, since the deflection of a typical beam balance within its mechanical limits is very small. If, however, an instrument such as a spring dynamometer is used to measure the force, the outer cylinder may rotate through a small angle in proportion to the increase of force as a result of the relative movement of the spring in the dynamometer. It is advisable in any case to measure the force at all times tangentially to the outer cylinder. It has been the experience with this instrument that, unless the fluid being tested is thixotropic, stable readings of force are attained within three seconds after the start of rotation at any given rate. Obviously, the less the change in rate of rotation, and thus in velocity gradient, the less the time required to reach equilibrium.

It is relatively simple to clean the apparatus after a run is completed. Inner cylinder 19 may be slid from shaft 18 and washed with a suitable fluid. With cylinder 19 removed, the remainder of the apparatus may easily be flushed out and wiped off. Port 35 is provided in frame 17 so that any fluid in reservoir 34 will drain out. Filling holes 31 may be flushed out using a cleaning fluid in syringe 25. Of course, if the instrument is to be used to measure successive samples of similar fluids, it is not necessary to disassemble between successive determinations but merely to overcharge the annulus with predetermined amounts of new fluid while the instrument is rotating. By so doing, the incoming fluid will flush the old fluid from the annulus. In such a case, it would probably be advisable to provide means to drain excess fluid from gutter 32.

In a viscometer that subjects the fluid to high shear rates, temperature rise in the fluid due to the conversion of shearing work into heat becomes a matter for concern, since in many cases the change in viscosity with temperature is so great that a few degrees variation in temperature in the fluid during the course of the test will invalidate the results of that test. To determine whether there is a significant temperature rise during shear in the viscometer described above, the viscometer was fitted with a fine duplex thermocouple, which protruded through one of the holes 31 into the annulus between the inner and outer cylinder. Cooling water, maintained at 21.00 C., the air temperature, was introduced continuously into open top chamber 33 and was continuously removed by means of an aspirator at such a rate that the chamber remained full. A viscous fluid consisting of a 10% solution by weight of Buna-N in aniline was introduced into the annulus, and the viscometer was rotated at a rate corresponding to a velocity gradient of 6690 sec.$^{-1}$. The following data was obtained:

| Time from Start, sec. | Temperature of Fluid, ° C. | Change of Temperature, ° C. |
| --- | --- | --- |
| 0 | 21.0 | |
| 5 | 21.0 | 0 |
| 30 | 22.2 | +1.2 |
| 60 | 23.0 | +2.0 |

The rigorousness of this test can be seen when it is realized that the net force required to restrain the ring of the viscometer during the test was 2500 grams. This corresponds to a shearing stress of 63 g./cm.$^2$ on the fluid, and an apparent viscosity of the fluid of 930 centipoises. The theoretical rate of temperature rise, owing to dissipation of shearing work in the fluid, assuming the fluid to be an adiabatic system, would be of the order of 1° C. per sec. for the fluid cited above. The fact that the observed rate of temperature rise was only 1/30th of the theoretical rate indicates that the shearing members of the viscometer serve as effective isothermal reservoirs for heat. This is due to the fact that the mass of these parts is very large compared to the mass of the fluid (some 300 g. to 0.75 g. in the particular instrument described) and that the fluid layer is so thin that rapid dissipation of heat from the fluid by conduction is possible.

Since equilibrium is ordinarily reached by the instrument within 3 seconds and since readings of force may be taken within 8 seconds using even fairly crude means for measuring force, it is clear that the control of temperature of the fluid in this instrument is sufficiently precise for ordinary purposes.

If, however, a more precise control of temperature is desired, the instrument may be modified to provide means for more efficient cooling. Such a viscometer provided with more efficient cooling means and illustrative of the changes in design which may be made without departing from the basic instrument described above is shown in Figures 2 and 3.

As in the case of the viscometer shown in Figure 1, the viscometer shown in Figures 2 and 3 is provided with an outer cylindrical surface 41 and an inner cylindrical surface 42, which surfaces are concentric and of substantially equal height. Outer cylinder 43, the supporting member for outer cylindrical surface 41, is mounted on the inner race 44 of ball bearing 45. Outer race 46 of ball bearing 45 is mounted in frame 47. Inner cylinder 49, the supporting member for inner cylindrical surface 42, is, however, in this instance, in snug but sliding engagement with centered cylindrical extension 52 of frame 47. Frame 47 is mounted on circular table 51, which in turn is mounted at the end of shaft 48. As before, all of the members so far enumerated are circular in cross section and are mounted concentrically about the axis of shaft 48 with the respective circular planes perpendicular to said axis. As will be noted from the drawing, this particular viscometer is adapted to be driven by suitable rotational drive means (not shown) mounted below and having a vertical drive shaft represented by shaft 48. Inner cylinder 49 is keyed to cylindrical extension 52 of frame 47, by means of key 53 in the top surface of said extension which engages in slot 54 in inner cylinder 49.

The fluid to be tested is injected into the annulus between inner cylindrical surface 42 and outer cylindrical surface 41 through hole 55 drilled through outer cylinder 43 and terminating at outer cylindrical surface 41 by means of a pressure-feeding device such as a syringe (not shown). Shaft 48, table 51, frame 47, cylindrical extension 52, and inner cylinder 49 are rotated as a unitary structure (each of these elements being restrained against relative rotational movement), and the force required to restrain outer cylinder 43 from substantial rotational movement is measured in the manner explained in detail above, or by a direct reading or recording electrical strain gauge, or other appropriate force-measuring device.

The viscometer is provided with a reservoir 56 beneath the annulus between the cylinders to collect any excess fluid draining from the annulus. The reservoir is provided with a drainage hole 57. A V-shaped groove 58 is formed in the bottom surface of outer cylinder 43 adjacent outer cylindrical surface 41 to provide a knife-edge at the bottom of the cylindrical surface to prevent any flow or fluid across the bottom surface of the outer cylinder. A gutter 59 is provided at the upper outer edge of outer cylinder 43 to collect any fluid which may emerge from the upper end of the annulus and to prevent any such fluid from coming in contact with ball bearing 45. The upper surface of inner cylinder 49 and outer cylinder 43 adjacent the annulus is sloped in such a manner that any fluid emerging from the upper edge of the annulus will flow into gutter 59 and away from the annulus. Gutter 59 may be provided with a drain leading to a suitable container, if desired.

Outer cylinder 43 is provided with a number of cooling water passages 61. The term, cooling water, is used for convenience, although it is obvious that fluid other than water may be forced through these passages and, depending upon the temperature of that fluid, may be used either for heating or cooling. Passages 61, as shown in the vertical cross section of Figure 2, are arranged vertically in outer cylinder 43 as close to outer cylindrical surface 41 and to each other as the requirements for uniform heat transfer to cylindrical surface 41 and the strength and dimensional stability of that surface permit. In the horizontal cross section, as shown in Figure 3, passages 61 continue concentrically about outer cylinder 43 for almost but not quite a full circle. Passages 61 terminate at one end in common vertical inlet pipe 62 and at the other end in common vertical outlet pipe 63. The two pipes are located as closely as possible together while allowing for the passage of hole 55. The two pipes are connected by means of flexible tubing to a suitable circulating, isothermal source of fluid. Termination of passages 61 in a common inlet and outlet insures substantially uniform scavenging of the fluid within the passages.

Inner cylinder 49 is similarly provided with cooling water passages 64, which terminate in common inlet passage 65 and common outlet passage 66. These passages are located as closely together as possible. Since inner cylinder 49 is a rotating member, passages 65 and 66 are led into vertical cylindrical extension 67 of inner cylinder 49 and terminate at vertically separated positions on the outer wall of extension 67. Extension 67 is surrounded by manifold 71, having inlet chamber 68 positioned to correspond with the terminus of inlet passage 65 and outlet chamber 69 positioned to correspond with the terminus of inlet passage 65 and outlet chamber 69 positioned to correspond with the terminus of outlet passage 66. The chambers are sealed from each other and from the extremities of extension 67 by means of O-rings 72. Chambers 68 and 69 are connected to a suitable circulating, isothermal source of fluid by means of inlet pipe 73 and outlet pipe 74, respectively. The upper surface of inner cylinder 49 is provided with gutter 75 to collect any cooling water which may leak from manifold 71 and prevent it from contaminating the fluid under test. A passage as indicated at 76 may be provided to permit the continual drainage of water from gutter 75 to reservoir 56.

A principal advantage of a viscometer constructed according to this disclosure lies in the fact that such an instrument measures the parameters of viscosity, i. e., shearing stress and velocity gradient, directly and does not require the use of any correction factors except a readily measured instrument factor.

Velocity gradient D may be calculated as follows. In a coaxial cylinder viscometer, the point velocity gradient D existing in a lamina of fluid at radius $r$ is equal to $rd\omega/dr$, wherein $\omega$=angular velocity. This assumes, as is the case, that the fluid under shear is contained entirely between cylindrical surfaces of constant radii. Because in this viscometer the distance between the inner and outer cylindrical surfaces is so small a fraction of the radius of either, negligible error is introduced by writing the differential equation cited in terms of finite measurements. Thus $$D = r\Delta\omega/\Delta r \text{ or } D = r_{av}(\omega_0 - \omega_i)/(r_0 - r_i)$$

where:

$r_0$=the radius of the outer cylindrical surface
$r_i$=the radius of the inner cylindrical surface
$r_{av} = (r_0 + r_i)/2$
$\omega_0$=angular velocity of outer cylinder (zero for this viscometer)
$\omega_i$=angular velocity of inner cylinder or $2\pi N$, where N is the revolutions per second of shaft 18 or 48.

Therefore, D is directly proportional to shaft speed.

It will be noted that since $\omega_0=0$, D appears to be a negative number. However, in fact, D is an absolute quantity. The + or − sign merely indicates direction of shear and may be ignored. In the case of the instrument described above where $r_0=1.245''$, $r_i=245''$ and $r_0-r_i$ was accurately measured as $0.0060 \pm 0.003$, $$D \text{ in sec}^{-1} = \left(\frac{1,307+69}{-62}\right)N$$

These figures indicate clearly some of the factors which must be considered in designing a viscometer of this kind. The larger $r_{av}$ and the smaller the annular clearance $(r_0-r_i)$, the greater is the rate of shear at a given velocity and the more valid is the assumption that $r=r_{av}$. On the other hand, if the annulus is made smaller, the dimensions and the circularity of the inner and outer cylindrical surfaces must be made more accurate and the tolerance for bearing run-out is reduced.

The shearing stress $\tau$ is calculated in the following manner. Shearing stress is defined as force F divided by area A. A is the area of the plane of shear. Since the distance between the inner and outer cylindrical surfaces is so small a fraction of the radius, it may again be assumed with negligible error that the shear occurs at a cylindrical plane having a radius equal to $r_{av}$. If $l$ is the height of the annulus between the inner and outer cylindrical surfaces, then $$A = 2\pi r_{av} l$$

In the instrument described above where $r_{av}=1.248''$ and $l=1.0''$, $A=50.5$ sq. cm.

Force F is the mean tangential force resulting from fluid shear along the plane of shear. Since, however, the force is not measured at the plane of shear but at a point at a greater radius from the axis, the measured force must be corrected. Since the moment of torque is, of course, constant for any given measurement $$F = F_n(r_m/r_{av})$$

where Fn is the net force measured and $r_m$ is the radius at which the tangential force is measured. Since the gross or measured force Fg equals the sum of the force due to the shear of the fluid Fn and the force due to bearing drag Fb $$F = (F_g - F_b)(r_m/r_{av})$$

The ratio $r_m/r_{av}$ is, of course, a constant determined by the design of the viscometer.

Thus it can be seen that viscosity $\eta$ may be determined if N and Fg and Fb at that value of N are known. Indeed, it is possible to instrument the viscometer to plot the customary stress-strain curves of the viscometric properties of a fluid by using an $x$-$y$ recorder measuring speed of rotation N on one axis and the difference between Fg and Fb on the other. Such an arrangement is especially suitable if the drive is designed to vary the speed of rotation at a constant rate which is slow enough that the fluid under test remains in essential equilibrium at all times. Direct determinations of yield value may be made by adapting such a drive to deliver varying amounts of torque at zero rotation as well as rotating at controlled and variable speeds of rotation.

If A is measured in sq. cm. and $f$ in grams-force, $\eta$ in centipoises is determined by the following relation:

$$\eta = 98,000\tau/D$$

The above formulae assume the idealized case of radial slip of perfect, concentric, cylindrical laminae of fluid past each other, a condition never completely achieved in any viscometer. There are five potential deviations in respect to the present viscometer which are important enough to be worthy of note. These possible deviations are caused by: (1) the presence of holes 31 or hole 55 in the outer cylindrical surface; (2) the issuance of new fluid into the annulus during a run; (3) the end effects due to the presence of excess fluid as of ill-defined rings above and below the upper and lower end of the annulus, respectively; (4) the vertical descent of fluid through the annulus under gravity; and (5) the transition from laminar to turbulent flow.

The effect of the holes or of fluid flowing into the annulus during the course of the test would appear to be negligible. Tests with viscosity calibrating solutions such as aqueous solutions of glucose and of glycerine show good agreement with the established viscosities of such solutions, and tests of fluids known to have Newtonian flow characteristics show straight line stress-strain diagrams as expected. In a series of tests, using a commercial varnish, the varnish was supplied continuously during some runs and before but not during other runs, without there being any noticeable difference in the force measured. It is, of course, advisable to keep the size of any holes entering the outer cylindrical surface as small as reasonably possible to minimize any effect which the presence of such holes may cause.

The presence of excess fluid accumulating above the annulus also appears to have a negligible effect. In several experiments, the fluid was intentionally allowed to accumulate to a depth of about 1/16 of an inch, and no difference in force measurement could be detected as compared to a run with the same fluid at the same speed when the fluid was just visible at the top of the annulus. Visual examination of this supernatant layer of fluid during rotation showed a gradual and slow change in radial velocity from the inner cylinder to the outer cylinder. Apparently, the maximum velocity gradient established in this supernatant layer, since it is not confined by annular boundary surfaces, is relatively small as compared to that in the annulus proper. The shearing force seems to be negligible due not only to the low gradient but also to the small shearing area as compared to the area of the annular plane of shear. As will be noted from the drawing, the viscometer is designed so that an accumulation of as much as 1/16 of an inch would not normally be anticipated.

The effect of fluid accumulation at the bottom of the shearing annulus is believed to be even less important, since during rotation of the viscometer, centrifugal force tends to drive the liquid against the sharp edge on the lower surface of the outer cylinder and the liquid falls clear without any apparent accumulation. It is advisable, however, to provide such a knife-edge so that this effect does not become a source of deviation.

The disturbance to flow caused by the descent of the fluid under gravity could potentially be a source of considerable deviation in the readings of this viscometer. Because of the narrow annulus, it has been theoretically determined that a fluid having a density of 1.0 would be retained in the annulus while the viscometer is at rest due solely to the surface tension effects of that fluid at the bottom edge of the annulus if the surface tension of that fluid is equal to or in excess of 19 dynes/cm., a value lower than that of most simple organic fluids and far lower than most aqueous solutions. However, the continuous movement of the fluid and the resulting continuous disruption of the surface during operation of the viscometer may well render this effect indeterminable.

In the absence of any surface tension effects, the fluid contained between the cylinder would act in the limiting case as a fluid contained between parallel walls of unlimited extent. The maximum velocity $V_0$, i. e., the velocity at the plane midway between the boundary planes, of a fluid under these circumstances is expressed by the relation:

$$V_0 = \frac{\gamma(\Delta r)^2}{8\eta}$$

where $\gamma$=specific weight
$\eta$=viscosity
$(\Delta r)^2$=the distance between the two planes.

Assuming that $\gamma$=980 dynes/cu. cm. (i. e., that the fluid has a density of 1), that $\eta$=50 centipoises (0.5 poise), and that the distance between the cylinders is 0.153 cm., as in the example above, $V_0$ is found to be 0.0574 cm./sec. and the average velocity V, which is 2/3 $V_0$, is found to be 0.0383 cm./sec. In the same viscometer, where the height of the annulus is 2.54 cm. and assuming a low rotational speed of 0.333 revolutions per second $$(D=433 \text{ sec.}^{-1})$$

the rotational velocity at the midplane of the annulus is approximately 3.3 cm./sec. An element of the fluid at this point would describe a helical path, the pitch of which would have an angle equal to $\sin^{-1}$ (0.0574/3.33) or about 1.0°. All elements of fluid in the annulus would have an angle of descent of the same order of magnitude, and obviously this angle would decrease at higher rotational speeds. It is unlikely that there is any measurable effect upon the accuracy of the determination of shearing stress caused by the vertical descent of the fluid when the angle of the helix is so small. However, deviation would be possible if the angle of the helix were to increase materially. This would occur if the rotational velocity were to be decreased appreciably as by reducing either the radius of the annulus or the speed of rotation; if the velocity of descent were to be materially increased as by increasing the width of the annulus, since the velocity of descent varies as the square of the width of the annulus; or if a fluid of lower viscosity were used, since the velocity of descent varies in direct proportion to the decrease in viscosity. All of these factors, of course, control the design of the viscometer. For example, if the radius of the viscometer is reduced, the width of the annulus should be reduced for a given viscosity if it is desired to render the instrument useful over a full range. Likewise, if the minimum viscosity of the fluid to be tested is reduced, so also should the width of the annulus be reduced at a given radius.

The same factors enter into the prediction of the velocity at which the onset of turbulent flow in the viscometer might be expected. It has been predicted that turbulent flow would occur in an instrument of the present type where:

$$\frac{r_i(r_o-r_i)^3\rho 2N^2}{\eta^2} > 43$$

where $r_i+r_o$ are in cm.
$\rho$ the density is in g./cu. cm.
$\eta$ is in poises Assuming a density of the liquid of 1.0, it is found that in the instrument having the dimensions given above, turbulent flow would occur when N exceeded 1950$\eta$. For a fluid of 50 centipoises (0.5 poise), this would require a speed in excess of 975 R. P. S., a speed which would not be expected in practice. However, it is to be noted that this relation varies inversely as the cube of the width of the annulus so that under some conditions were the width of the annulus to be increased, the maximum rotational velocity would become limited by the onset of turbulence.

It appears clear from the foregoing discussion that the particular dimensions given above are not critical. However, it is equally clear that there are certain rather definite limits to the relative size of the various parts of the viscometer if the instrument is to operate in the manner desired with reasonable accuracy.

For example, the ratio of the width of the annulus to the radius of either the outer or inner cylindrical surface is of importance, since this ratio determines the validity of the assumption that $d\omega/dr$ may be expressed as $\Delta\omega/\Delta r$ and that $r=r_{av}$. It also enters into the determination of the threshold of turbulent flow. In the particular example, this ratio is approximately 1:200, and it would appear that in no case should it be less than 1:100.

The width of the annulus itself plays an important part in the value of the descent velocity of the fluid, since this velocity varies as the square of the width. It has been determined experimentally that a viscometer having a width of annulus of 0.0153 cm. is satisfactory for fluids having a viscosity as low as 50 centipoises. If it be desired to test fluids having a much lower viscosity, the width of the annulus would have to be reduced. On the other hand, a much wider annulus within the limits given above might be used if it were desired to use the viscometer only with fluids having a much greater viscosity.

The size of the radius of the annulus is controlled by several factors. The minimum rate of shear at a given width of the annulus is reduced either by reducing the radius or by reducing the speed of rotation. Since in the instrument described above, a speed of 20 R. P. M. results in a rate of shear of 433 sec.$^{-1}$, it is easy to see that it is most convenient to reduce the radius. However, when this is done, the accuracy to which the parts are finished becomes a limiting factor if reasonable degrees of accuracy are desired. For normal purposes, it would appear that the radius should not be less than ½″ and not more than 2½″. The height of the annulus is controlled only by the amount of power available for the drive, the amount of force that it is convenient to measure in relation to the viscosity of the fluids desired to be tested, and the ratio of bearing drag to the gross force.

I claim:

1. A viscometer adapted to measure corresponding point values of both shearing stress and viscosity gradient and especially adapted to indicate the rheological properties of a non-Newtonian fluid, having two elements comprising two rotatable, opposed linearly coextensive, coaxial, cylindrical surfaces, said surfaces defining therebetween as the sole boundaries thereof, an annular space for the containment of said fluid, the width of said annular space being but a minor proportion of the radius of either surface and dimensioned to permit the retention therein of an unsupported annulus of the fluid without substantial drainout, a bearing disposed in close proximity to the two elements to maintain the accurate alignment and concentricity of said surfaces and permitting the free rotation of one said element with respect to the other, means for introducing the fluid directly into said annular space, means for rotating one of said surfaces, and means for measuring the force required to constrain the other of said surfaces.

2. A viscometer adapted to measure corresponding point values of both shearing stress and velocity gradient and especially adapted to indicate the rheological properties of a non-Newtonian fluid, having two elements comprising two rotatable, opposed, linearly coextensive, coaxial cylindrical surfaces, said surfaces defining therebetween as the sole boundaries thereof, an annular space for the containment of the said fluid, the width of said annular space being not substantially greater than 1% of the radius of either surface and dimensioned to permit the retention therein of an unsupported annulus of the fluid without substantial drain-out, a bearing disposed in close proximity to the two elements to maintain the accurate alignment and concentricity of said surfaces and permitting the free rotation of one of said elements with respect to the other, means for introducing the fluid directly into said annular space, means for rotating one of said surfaces and means for measuring the force required to constrain the other of said surfaces.

3. A viscometer adapted to measure corresponding point values of both shearing stress and velocity gradient and especially adapted to indicate the rheological properties of a non-Newtonian fluid having two elements, comprising two rotatable opposed, linearly coextensive, coaxial, cylindrical surfaces, said surfaces defining therebetween as the sole boundaries thereof, an annular space for the containment of the said fluid, the width of said annular space being not substantially greater than 1% of the radius of either surface and dimensioned to permit the retention therein of an unsupported annulus of the fluid without substantial drain-out, a radial anti-friction bearing disposed between and in close proximity to the two elements to maintain the accurate alignment and concentricity of said surfaces and permitting the free rotation of one of said elements with respect to the other, means for introducing the fluid directly into said annular space, means for rotating one of said surfaces and means for measuring the force required to constrain the other of said surfaces.

4. A viscometer adapted to measure corresponding point values of both shearing stress and velocity gradient and especially adapted to indicate the rheological properties of a non-Newtonian fluid, having two elements comprising two rotatable, opposed, linearly coextensive, coaxial, cylindrical surfaces, said surfaces defining therebetween as the sole boundaries thereof, an annular space for the containment of the said fluid, the width of said annular space being not substantially greater than 1% of the radius of either surface and dimensioned to permit the retention therein of an unsupported annulus of the fluid without substantial drain-out, a bearing disposed in close proximity to the two elements to maintain the accurate alignment and concentricity of said surfaces and permitting the free rotation of one of said elements with respect to the other, means for introducing the fluid directly into said annular space, drive means for rotating the inner of said surfaces and force responsive means for measuring the force required to constrain the outer of said surfaces.

5. A viscometer adapted to measure corresponding point values of both shearing stress and velocity gradient and especially adapted to indicate the rheological properties of a non-Newtonian fluid, comprising a base, a radial anti-friction bearing having inner and outer races, inner and outer concentric viscometric elements, said base having axial and peripheral extensions supporting, respectively, the inner element and the bearing, interlocking means between the inner element and the axial extension to cause said element to rotate with the base, the outer viscometric element being mounted within the bearing on the inner race thereof, the adjacent surfaces of said inner and outer elements defining opposed, linearly coextensive, coaxial cylinders, said cylindrical surfaces defining therebetween as the sole boundaries thereof, an annular space for the containment of the said fluid, the width of said annular space being not substantially greater than 1% of the radius of either surface and dimensioned to permit the retention therein of an unsupported annulus of the fluid without substantial drain-out, drive means for rotating the base, force-responsive means for measuring the force required to constrain the outer element from substantial rotational movement, and a bore passing through the outer element and terminating in the cylindrical surface thereof to permit the direct introduction of a fluid into the annular space defined by said surfaces.

6. A viscometer adapted to measure corresponding point values for both shearing stress and velocity gradient and especially adapted to indicate the rheological properties of a non-Newtonian fluid comprising two rotatable elements having opposed, linearly coextensive, coaxial, cylindrical surfaces, said surfaces defining therebetween as the sole boundaries thereof, an annular space for the containment of said fluid, the width of said annular space being not substantially greater than 1% of the radius of either surface and dimensioned to permit the retention therein of an unsupported annulus of the fluid without substantial drain-out, a bearing disposed in close proximity to the two elements to maintain the accurate alignment and concentricity of said surfaces and permitting the free rotation of one of said elements with respect to the other, means for introducing the fluid directly into said annular space, means for equalizing the temperature of said surfaces with a fluid heat regulating medium including passages for said medium in the body of each element adjacent the cylindrical surfaces thereof, means for rotating one of said surfaces, and means for measuring the force required to constrain the other of said surfaces.

7. A viscometer adapted to measure corresponding point values of both shearing stress and viscosity gradient and especially adapted to indicate the rheological properties of a non-Newtonian fluid, having two elements comprising two rotatable, opposed, linearly coextensive, coaxial cylindrical surfaces, said surfaces defining therebetween as the sole boundaries thereof an annular space for the containment of the said fluid, each of said surfaces being backed by cooling channels formed in the body of the element and extending concentrically adjacent each surface for a major portion of the full circle, inflow and outflow passages formed in the body of each element intercepting each channel at the ends thereof, means to force a cooling medium through said passages and channels, a bearing disposed in close proximity to the two elements to maintain the accurate alignment and concentricity of said surfaces and permitting the free rotation of one of said elements with respect to the other, means for introducing the fluid directly into said annular space, means for rotating the inner of said surfaces and force responsive means for measuring the force required to constrain the other of said surfaces.

References Cited in the file of this patent

UNITED STATES PATENTS

| | | |
|---|---|---|
| 1,727,836 | Miller | Sept. 10, 1929 |
| 1,836,995 | Stickney | Dec. 15, 1931 |
| 2,122,470 | Hoffman | July 5, 1938 |
| 2,553,844 | Buchdahl | May 22, 1951 |
| 2,713,790 | Barber et al. | July 26, 1955 |

FOREIGN PATENTS

| | | |
|---|---|---|
| 482,950 | Great Britain | Apr. 6, 1938 |

OTHER REFERENCES

"Southwestern Industrial Electronic Co.," Publication entitled, "Texaco Viscosimeter," received in Patent Office, Div. 36, March 13, 1950.

UNITED STATES PATENT OFFICE
CERTIFICATION OF CORRECTION

Patent No. 2,812,656                              November 12, 1957

Edward Wilson Merrill

It is hereby certified that error appears in the above numbered patent requiring correction and that the said Letters Patent should read as corrected below.

Column 4, line 10, for "2,490"" read -- 2.490" --; column 5, line 38, for "21.00 C." read -- 21.0° C. --; column 7, line 71, for "1.245"" read -- 1.251" --; same line 71, for "245"" read -- 1.245" --; line 72, for "0.003" read -- 0.0003 --; column 8, line 30, the formula should appear as shown below instead of as in the patent:

$$F=F_n(r_m/r_{av})$$

same column 8, lines 31 and 34, for "Fn" read -- $F_n$ --; line 54, for "f" read -- F --; column 9, line 68, for "0.153" read -- 0.0153 --; column 10, lines 35 and 36, the equation should appear as shown below instead of as in the patent:

$$\frac{r_i(r_0-r_i)^3 \rho^2 N^2}{\eta^2} \rightarrow 43$$

same column 10, line 48, for "cube" read -- 3/2 power --.

Signed and sealed this 30th day of October 1962.

(SEAL)
Attest:

ERNEST W. SWIDER
Attesting Officer

DAVID L. LADD
Commissioner of Patents